May 10, 1955  A. B. SOWTER  2,707,821
COLD PRESSURE WELDING

Filed July 18, 1950  3 Sheets-Sheet 1

INVENTOR
ANTHONY. B. SOWTER
BY
ATTORNEY

May 10, 1955 — A. B. SOWTER — 2,707,821
COLD PRESSURE WELDING
Filed July 18, 1950 — 3 Sheets-Sheet 2

INVENTOR
ANTHONY B. SOWTER
BY
ATTORNEY

United States Patent Office 2,707,821
Patented May 10, 1955

2,707,821

COLD PRESSURE WELDING

Anthony Bagnold Sowter, Middlesex, England, assignor to The General Electric Company Limited, London, England Application July 18, 1950, Serial No. 174,387

Claims priority, application Great Britain June 28, 1948

1 Claim. (Cl. 29—432)

This application is a continuation-in-part of application Serial No. 123,315, filed October 25, 1949, entitled Cold Pressure Welding, now Patent No. 2,522,408, a continuation-in-part of application Serial No. 86,930, filed April 12, 1949, now abandoned.

Heretofore it has been regarded that good welding has, as an essential requisite, the use of relatively high temperatures. There are many metals where the relatively high temperatures (i. e. 1500° F. and higher) regarded as essential for welding result in deleterious effects on the metal. This was particularly so in the case of such metals as aluminum, and also in the case of copper which was softened and annealed in the region of the welding. This occurred to such an extent that complex mechanisms were utilized in an attempt to overcome this softening effect which destroyed the mechanical strength of the metal.

Moreover, the welding mechanisms employed are complex and costly since the high temperatures employed make it essential to maintain the operating temperatures within close critical ranges. An application of heat for a slightly increased period of time over that actually necessary further deteriorates the metal and the use of a temperature slightly below that required results in an imperfect weld which fails to properly hold. Because of this marginal character of high temperature welding, not only is it necessary to employ complex and costly welding machines, but specially skilled operators who have special training in controlling and operating the welding equipment.

Moreover, industrial plants utilizing electric welding machines have experienced serious problems with their current loads due to the extreme fluctuation in the current flow as the equipment was turned on and off.

In the face of these extreme difficulties with high temperature welding, it has heretofore been regarded as impractical to attempt to weld by any other means than by the use of sufficiently high temperature to produce a flow of the two metals to be joined to each other and extensive research has been carried on in an attempt to correct these complications of high temperature welding.

I have discovered that by the proper control of the metals to be welded, pressures and the use of proper welding dies, I can and have achieved good commercial welds utilizing simply pressure at ambient or room temperatures or slightly above ambient and well below any temperature which would alter the characteristics of the metal being welded.

In essence the cold pressure welding of my invention contemplates bringing metals to be welded into contact with each other and, by the applicataon of pressure and without the use of any external heat, causing the metal to flow away from the welding point and into interleaved relation with the grains of the metals being welded.

Inasmuch as metals are usually faced with films of oxide, before the metal itself can be caused to flow into each other as stated above, these oxides must first be dispersed. This dispersal of the surface film may be accomplished at the interface by the application of pressure to cause sufficient flow of the metal, but I have discovered that I can effect cold welding by a considerable reduction in the flow of the metal if I first effectively remove the film on the face of the metal in a manner to be described hereinafter.

The pressure applied must be of a value just above the flow point of the metal and must be so applied as to permit unrestricted flow of the metal either away from the weld or into the material; that is to say, there should be no substantial restriction to the free flow of the metal from under the pressing parts of the tool.

The weld is secured by a penetration into the welded metal produced by the pressure applied to the welding tools. This penetration varies with the metals such as aluminum, copper, etc. For commercial purity aluminum, the best results as regards strength at the weld are obtained when the cross-section or thickness of metal is reduced by penetration to an amount of the order of 70%. For copper and silver the cross-section reduction is of the order of 80–90%.

I have further found that by the use of proper welding tools and by a control of the penetration into the metal, a minimum reduction in thickness required to ensure satisfactory welding varying from metal to metal can be achieved.

The strength of a joint formed by cold welding will depend on its shape with respect to the stress to which the weld is to be subjected. By a proper layout of welds in relation to the stress, it is possible to so arrange the joint as not to sacrifice tensile strength of the finished product.

Accordingly, an object of my invention is to provide a novel process of and apparatus for cold welding.

A further object of my invention is to provide novel welding tools particularly suited for cold pressure weldings.

Still another object of my invention is to provide a novel process of cold pressure welding in which the pressure applied is just above the flow point of the metal.

Still a further object of my invention is to provide a novel process of cold pressure welding in which the metal is permitted free unrestricted flow.

Another object of my invention is to provide a novel process of cold pressure welding in which minimum reduction in the cross-section of the metals being welded is secured.

Still another object of my invention is to provide a novel process of cold pressure welding in which by proper surfacing of the metals and control of pressure, tools, and location of welds, minimum pressures and metal reductions are required to achieve commercial welds.

The above and further objects as well as novel aspects of the invention will be better understood from the following detailed description taken in connection with the accompanying drawings forming part of this specification and wherein.

Like reference characters identify like parts throughout the different views of the drawings.

Figure 1:
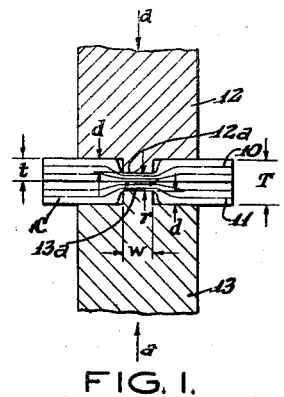
Figure 1 is a schematic cross-sectional view, showing a pair of specially constructed welding dies for cold welding a pair of overlapping metal strips shown at the end of the cold welding operation according to the invention.

As stated hereinabove, a film of oxide begins to form on aluminum immediately after the actual metallic surface of the aluminum is exposed to the atmosphere. Several days may elapse before the film reaches its final thickness. Once formed, however, although thin by ordinary standards, this film is sufficient to reduce the weldability of the material.

As pointed out, in cold pressure welding, the metal is caused to flow away from the welding point or contact area as the dies or tools are brought together. The effect of this flow at the interface is to disperse the protective or oxide film in the material and so bring about the necessary metallic contact required for welding. More flow will be required to disperse the oxide film and produce this contact if the film has reached its final thickness than if it is almost or completely non-existent. As a result, in order to obtain the best welds with a minimum reduction in metal thickness at the weld, the surface to be welded should be free from any contaminating oxide film or other impurities such as foreign matter, oil, grease, etc. adhering to the surfaces to be cold welded.

Accordingly, good results for the present invention are achieved when the metal has a clean surface from which the oxide or other film or foreign matter has been removed prior to the cold welding operation should such film or foreign matter be present. Once the surfaces have been cleaned, advantage can be taken of the time required for the oxide film to reform to any appreciable extent by welding shortly after the cleaning operation.

Usual cleaning methods such as filing or treatment with abrasives has been found to leave impurities ground back into and re-embedded in the surface. Moreover, particles of the abrasive are also left behind.

The technique for securing such a clean surface will differ with different metals. In the case of aluminum, I have found that the surface must first be grease-free and dry. A power-driven rotary scratch brush consisting of steel wire and running at a surface speed of about 3,000 ft./min. is used. With the surface grease-free and dry, the rotating scratch-brush will seize with the surface and remove the heavy oxide layer. The brush used is preferably a fine steel wire which will not damage the stock or remove too much aluminum. The surface of the work is held against the brush long enough to make the drag felt, which occurs when the steel wires break through the oxide film and seize on the metal surface beneath. Small particles of the body metal and its coating of oxide are thus torn out and flung clear because of the speed at which the brush passes over the surface being cleaned.

As will now be understood, the hardness and gauge of the steel wire should be related to the dimensions of the work in hand, since it is obviously undesirable to weaken the structure by removing more metal than is absolutely essential to clean. Thus, materials other than aluminum may require the use of a coarser brush or a pickling process to remove the oxide scale. Indeed, in the case of copper, I have found that the oxide is very resistant to scratch-brushing.

The end result of the scratch-brushing should be a surface having a fine, even grained appearance free from dragging through over scratch-brushing.

As stated above, the metals to be welded are subjected to variable pressures depending on the metals but the applied pressure, however, should always be just above the flow point of the metal. In the case of aluminum, by way of example, this pressure is of the order of 12 to 18 tons per square inch which is only slightly above its flow point. In the case of copper this pressure is from two to four times this value.

Inasmuch as the pressure applied results in a flow of metal until the two metal surfaces become welded together, the weld pressure must be so applied as to permit substantially unrestricted flow of metal either sideways away from the weld point or into the thickness of the sheet. In the former case, I have found that slightly lower pressure is required since the flow is easier, particularly if the weld is applied near the edge of the material. The correct parameters of the weld also helps keep the required pressure low. Thus, if the area of the pressed area is small compared to the perimeter as in the case of a long and narrow rectangular weld area, a greater freedom of lateral flow of metal with resultant improved weld results.

I have found that the rate of application of the pressure does not appear to affect the strength of the weld. Thus, good welds have been secured giving either a slow squeeze or an impact. The actual work in both cases is the same, the only change being in the power or rate of doing work. While, however, the rate of pressing is not very material, I have found that the shape of the tool is a factor in good welding.

Welding dies for commercially pure aluminum can be made of mild steel or from an unhardened chrome-manganese tool steel. Neither of these materials gives any trouble with "pick-up" of aluminum, such "pick-up" as does occur being confined to a slight surface contamination having the appearance of a thin plating. Usually, tungsten and molybdenum steels should be avoided for tools.

Figure 2:
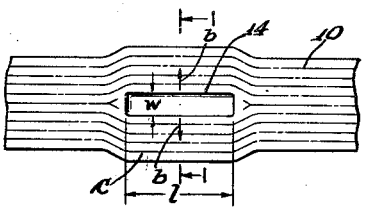
Figure 2 is a top view of the strips of Figure 1 joined by cold pressure welding in accordance with the invention.

Referring to Figures 1 and 2, there is shown schematically a tool for producing rectangular spot welds according to the invention. A pair of work pieces 10 and 11, shown by the way of example in the form of strips or plates of aluminum, copper or other ductile metal capable of being cold pressure welded, after having their contacting surfaces cleaned as described above, are placed between dies 12 and 13. These shouldered dies have welding tips or teeth 12a and 13a, respectively. Pressures of the order described above are applied at opposite sides of the superposed or overlapping pieces 10 and 11 to be welded together by means of a suitable tool such as a band or power press, in a manner as will be readily understood.

Figure 6:
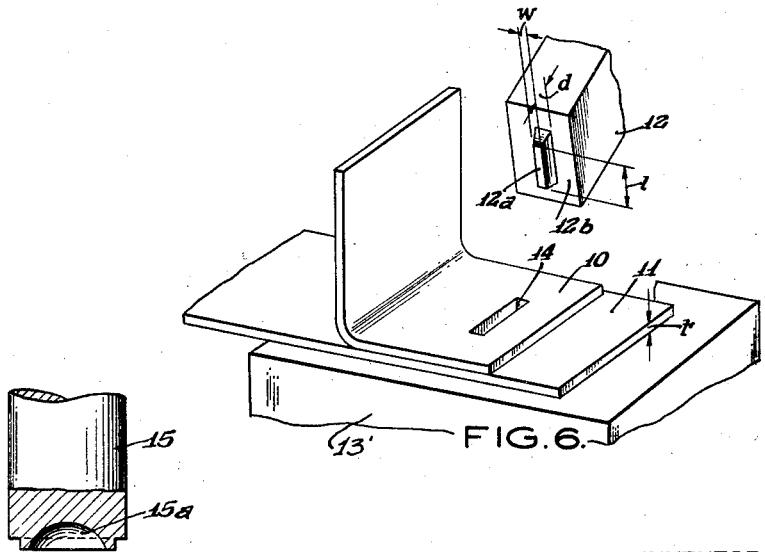
Figure 6 illustrates a further modification for producing a single cold weld with the welding pressure or a single die applied on one side of the work pieces only.

In order to ensure a satisfactory spot weld of this type, the size of the contact area of the welding die or tips 12a and 13a and in turn the shape and size of the weld are dependent substantially on the gauge thickness $t$ of the plates or other pieces being welded. If $l$ is the length and $w$ the width of the rectangular pressure or contact area, the width is made equal to or of the order of the gauge thickness $t$ while the length $l$ should be a multiple of the gauge thickness or about $5t$ or more as found by tests and practical experiments. This applies to symmetrical tools working from both sides of the weld as shown in Figure 1 and indicated by the arrows $a$. When it is necessary to avoid a depression or indentation on one face of the work, as shown in Figure 6, a single tool may be used in conjunction with a flat plate or anvil ($13'$, Figure 6), in which case $w$ is increased to $1.5t$. In cases where the material being worked with symmetrical tools is inclined to be rather short and hard, that is to say, the material is tending towards the limit of ductility suitable for cold pressure welding, it has been found an advantage to increase the face width up to about $2.5t$. This also helps the stability and alignment of the press tools.

The final gap between the tools 10 and 11 or between a single tool and an anvil, is either set by a stop limiting the closure of the press or by the depth $d$ of the shoulders or tips $12a$ and $13a$. It is preferable to make the surfaces of $12a$ and $13a$ flat to get the strongest mechanical results although they could be made slightly rounded or faceted. But under no conditions should they have a form which is sharp rounded, that is of small diameter. Thus, in section, the welding surface of a tool should not form part of a circle whose diameter is only up to a few times the thickness of the material to be welded and the diameter should generally be, for good results, greater than three times the total thickness of the work. When the diameter is infinite, the best results are generally obtained. Although the shouldered tool has an advantage over a plain tool as shown in Figure 3, in that it restores any distortion of the metal produced by the welding process in a direction transverse to the contacting surfaces between plates or other pieces being welded, both plain and shouldered tools can be used by welding.

Figure 3:
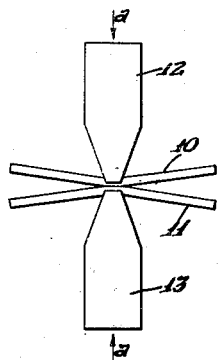
Figure 3 is similar to Figure 1, showing a modification of the welding die construction.

The plain tool, Figure 3, with a closely controlled blow such as given by an automatic centre punch is especially suitable for welding gauge thicknesses of the order of .012 in. or thinner, while the shouldered tool, Figure 1, using a specially shaped punch and handle is suitable for thicknesses of the order of .036 in. or more.

The size of the gap $r$ between the tools, or the tool and anvil, is limited to prevent further penetration after the welding point has been reached, the minimum reduction in thickness required to insure a satisfactory weld varying from metal to metal. Metals can be classified, as regards their suitability for cold pressure welding, by taking as a "figure of merit" the relation $$\frac{r}{T}\cdot 100$$

wherein $r$ is the thickness of the weld and $T$ represents the total thickness of both work pieces or plates to be welded together.

The suitable gap $r$ for the tools is, therefore, given in the following table giving the approximate "figures of merit" for various metals as found by experiments.

| Material: | Figure of merit |
|---|---|
| Super-pure aluminum | 40 |
| Commercial purity aluminum | About 30 |
| Aluminum and 2% magnesium | 30 |
| DTD 346 aluminum | 29 |
| Aluminum + 1¼% manganese | 20 |
| Duralumin | 20 |
| Cadmium | 16 |
| Lead | 16 |
| Copper | 14 |
| Nickel | 11 |
| Zinc | 8 |
| Silver | 6 |

For example, since the value for commercially pure aluminum is 30, the gap should be set at $$\frac{30}{100}\cdot T$$

or in other words, the thickness of the welding joint should be 30% of the total work thickness $T$ in the case of aluminum, to insure both a satisfactory welding connection as well as adequate mechanical strength of the welded joint. The shape of the actual welding surfaces of the tools should be so arranged that the thickness of the welded joint is equal to at least 6% of the total thickness of the two pieces of material to be welded together and this over an area whose shortest dimension is equal to at least the gauge or thickness of the pieces to be welded. Of course, as shown in the table given above, the thickness of the joint will vary with the type and hardness of the materials used and should be adjusted to the most convenient value. This can be determined in practice by a few trials. It is to be understood that the above figures of merit could be varied widely but such variations should only be used where the maximum obtainable strength at the weld is not required. However, in no case must a weld be made where the thickness is reduced to a value at which the two opposite tools or dies approach touching each other or touch as would result by using two circular section tools of comparatively small diameter.

Although the metal thickness has been reduced substantially over the welding area, in the manner pointed out, the metal has in some cases been work-hardened to twice its original strength, as a result of the welding operation, so that the welded section will in these cases be about half as strong as the original single work piece. By a proper lay-out of the welds in relation to the stress to which the material will be subjected, it will be generally possible to arrange the joint without sacrificing any tensile strength. If cold pressure welding is used for making electrical connection between wires or strips, it is found that with aluminum a well-proportioned joint has a lower electrical resistance than an equivalent section of unjointed material.

Referring to Figure 3, the effect of using a plain tool is illustrated and the drawing shows the result of using tools 12 and 13 which are only tapered to the pressure tips. Here, the two strips 10 and 11 of metal to be welded suffer distortion as distinguished from Figure 1 where the shouldered tools 12 and 13 substantially preventing distortion of metal by confining the displaced metal to a given space are restoring the distorted metal surface at the completion of the welding process around the welded joint. The shoulders of the tools may also control the percentage reduction in thickness by limiting the ultimate size of the gap between the pressure tips of the tools. If desired, the tips $12a$ and $13a$ may move relative to the tools 12 and 13, each of the tips being mounted in the centre of a pressure pad. In such a case, the pads and tips will engage the metal together and then the tips will move through the pads to effect welding, the pads preventing or limiting distortion of metal.

Figure 4:
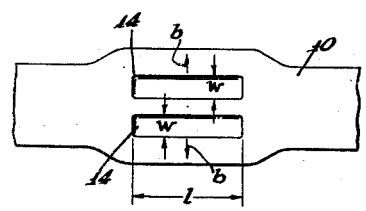
Figures 4 and 5 are further top views of cold welded strips or equivalent work pieces joined by a plurality of cold welds to increase the mechanical strength of the welding joint.
Figure 5:
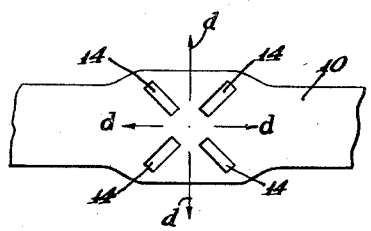
Figure 11:
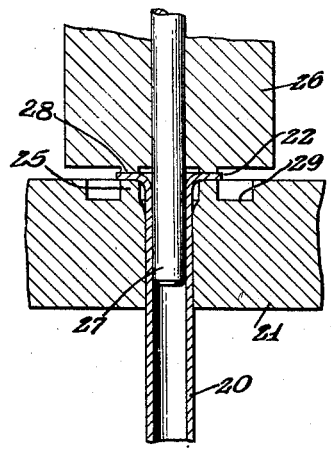
Figure 11 illustrates a die arrangement for welding a tube to a thick plate.

Figures 4 and 5 show a pair of cold welded plates connected by a plurality of separate welds to improve the mechanical strength of the welded joint. In Figure 4, a pair of adjacent parallel welds 14 are provided in place of the single weld of Figures 1 and 2, while in Figure 5 welds 14 are provided arranged at angles of 45° with the longitudinal dimensions of plates or angles of 90° between themselves. The advantage of the latter arrangement is to reduce the jamming effect of the metal which otherwise tends to build up between the welding tips. The weld indentations are disposed, as it were, radially so that flow of metal away from the flanks of the welding faces is facilitated. This layout of the welds gives good mechanical strength in direct tension but the plates peel apart more easily than when the interrupted ring shape of weld shown in Figure 11 is used. However, the radial weld layout is better from the electrical conduction point of view since it has a greater current carrying capacity.

Normally tools are used which indent both sides of the work. Where it is necessary to work against an internal supporting piece or if one side should be kept flat for the sake of appearance, it is possible, though not quite as satisfactory, to make all the indentation on one side only. In this case the tool face width is increased to about 1½ gauge thickness. This enables impact welding to be used without guiding fixtures. For example, a tool with a backing face to limit penetration to the desired amount can be used in a portable riveting tool.

Where two different metals, such as aluminum and copper, are to be welded, the area of the die coming in contact with the softer metal is made larger than that coming in contact with a harder metal. This controls the sharing of the final weld thickness by the two metals. The area of the weld will follow the smaller welding face and there will not be a tendency as might otherwise occur if the same areas were used of squeezing the softer aluminum to an extent where the final thickness is taken up entirely by the copper.

Figure 6 shows, in perspective, a single tool 12 cooperating with a flat anvil 13', Figure 6, and having a tapered pressure tip 12a with a flat end or operative contact area and a shoulder 12b, and the weld 14 form where two strips of aluminum 10 and 11 are welded together. Actually the height $d$ of the tip 12a from the shoulder 12b controls the percentage reduction, the width $w$ of the flat end of the tip being 1.5 times the thickness $t$ of the strip or plates and the length $l$ being about $5t$, as above pointed out.

Figure 6A:
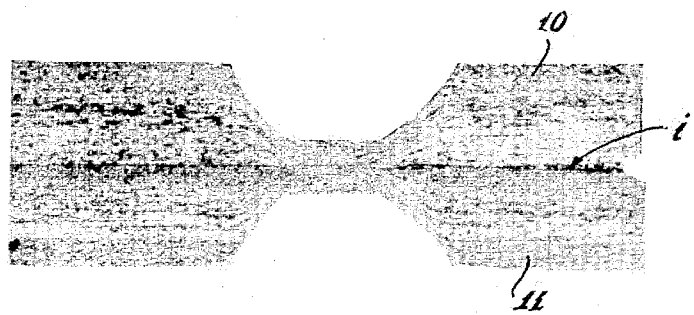
Figures 6A and 6B are photomicrographic cross-sections, respectively, of a double-sided and a single-sided cold pressure weld made in accordance with the invention.
Figure 6B:
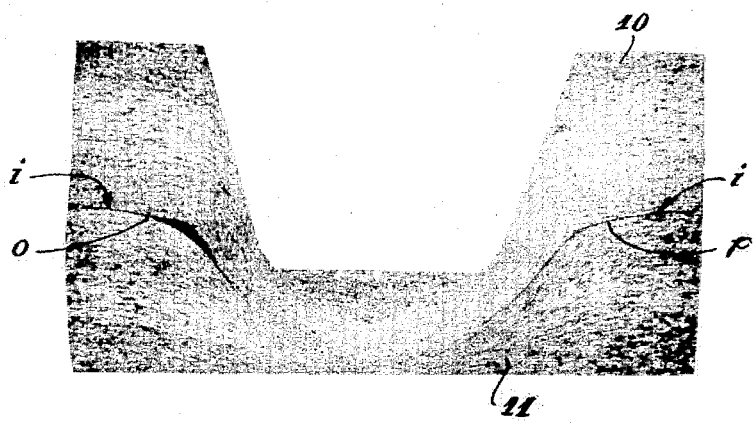

Figure 6B which is a photomicrographic cross-section of a single-sided weld made according to Figure 6, more clearly shows the displacement of the interface $i$ at the weld area or drawing of the indented member 10 beyond the plane thereof, as well as the change of the interface from a substantially flat shape to a distorted or rounded configuration resulting in a metal flow and extensive interfacial action sufficient to effect a merging of the members 10 and 11 into a solid phase welding bond.

Figure 6A is a similar photomicrographic section of a double-sided weld made in accordance with Figures 1 and 3 and shown to contrast the differences in the resulting welds which are obtained in a single-sided weld over a double-sided weld. Thus, it will be noted that in Figure 6A the original interface $i$ at the weld area has not changed. It has also been found that the area of this weld section is somewhat less than the mean applied pressure area of the welding tools. This is true whether a tapered tool is employed as in Figure 6 or whether a straight tool is used as in Figure 1.

On the other hand, in Figure 6B the original interface at the weld area has been distorted considerably so that now it extends downwardly starting at $o$ and terminating at $p$. As a result of this elongation of the interface a drawing action has resulted which toughens the metal and also improves the weld. In addition it is found that the weld area in practice has now been extended, whereby to result in a weld which is somewhat larger than the mean applied pressure area of the welding tool.

There is thus provided by the invention a cold welding process for joining the surfaces of metals or metal alloys, in particular aluminum or copper, wherein the application of pressure not only brings the surfaces into close contact but also causes flow to take place, with the result that the two metal pieces become welded together.

In cold welding, the metals are made to flow when cold by the application of sufficient pressure and the conditions in accordance with the invention is such that some re-crystallization may take place at room temperature. In cold welding the material is hardened in some cases by the work which is put into it, which constitutes an advantage, as although the cross-section of the work is usually decreased, the loss in strength is counter-balanced to a certain extent by the hardening. The pressure, as well as the size and shape of the dies and the location of the weld, should be such as not seriously to hinder the displacement of the excess metal, resulting from the reduction of the work thickness at the welding joint.

Therein lies one of the reasons for the advantage of the strip-like or rectangular shape of the weld, resulting in a substantial pressure transverse to the longer side of the rectangle, as shown diagrammatically in Figures 1 and 2 by lines $c$ indicating the metal flow from the dies. The weld may be placed fairly close to the edge of the work pieces to enable ready displacement of the excess metal laterally of the welding joint, as indicated by the increased width or lateral bulge of the welded pieces in Figures 2, 4 and 5. But the weld need not necessarily be placed fairly close to the edge of the work pieces and may be at a substantial distance from the edge, the displaced metal being possibly taken-up in the thickness of the material of the work pieces. In Figures 2 and 4 the metal is allowed to flow in the direction of the arrows $b$ or substantially transverse to the longitudinal edge of the work pieces, while in Figure 5 the lateral flow of metal from the welding faces of the tools builds up into a ring of pressure which causes a resultant flow of metal in the directions indicated by the arrows $d$. In a case as illustrated where the strip width is small in proportion to the size of tool used and the consequent resistance to deformation is low, this outward flow actually stretches the material about the centre of the tool and reduces its thickness.

In seam welding a tube of aluminum, strip aluminum would first be formed into tubing by, for example, suitable forming rollers and having the edges of the strip cleaned, by scratch-brushing, and overlapping. Then the seam would be welded by one or more lines of separate and individual cold welds along the overlapping edges, the sealed areas of adjacent welds meeting or overlapping. As will be appreciated, even though a percentage reduction of 70% may be obtained at each cold weld, between the individual welds there is metal which had not been reduced in thickness and, therefore, the seam is considerably stronger mechanically than if a continuous cold weld had been made along the seam.

Figure 7:
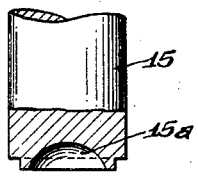
Figure 7 shows a modification of a welding die according to the invention.

As will be evident from the foregoing, the shape of the dies for effecting a cold weld as well as the placing and orientation of the weld if properly chosen will enable the excess metal as a result of the percentage reduction of the thickness of the material, to be readily displaced, in the manner described in connection with the examples shown. According to a modification, a shouldered die is provided with one or more suitable recesses within the shoulder thereof and adapted to receive the excess metal displaced substantially in the direction of the pressure applied by the die. In the previous examples as shown in Figures 2, 4 to 7, the displacement is in a direction substantially transverse to the die pressure. The die 15 shown in Figure 7 provides an alternative method of relieving the pressure in the center of the die in the direction of the die pressure, by making a relief 15a which can accommodate the surplus material.

Figure 8:
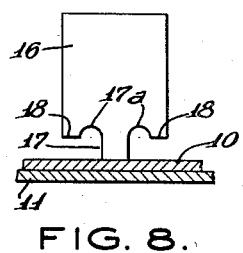
Figure 8 shows a modified welding die of the type according to Figure 7.
Figure 9:
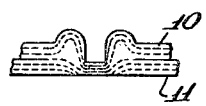
Figure 9 illustrates a weld obtained by the use of a die according to Figure 7.

A somewhat modified die 16 of this type is shown in Figure 8, comprising only a single tip 17, of square, rectangular or even circular shape, and a pair of recesses 17a in the shoulder 18 on either side of said tip adapted to accommodate the excess or displaced metal and to result in a weld as indicated by the displacement lines of Figure 9. Again the tool thickness of pieces 10 and 11 is substantially reduced and the excess metal displaced at right angle to the plate or plates being welded. As is understood, welds may be produced by a pair of like dies applied from opposite sides of the work instead of the single die and anvil arrangement shown in the drawings. The shoulder 18 may form a pressure pad to force material up.

The shouldered or other forms of tools according to the invention may be used, suitably modified where need be, for straight line, arcuate, ring or other welds and may also be used for continuous seam welds.

In making a continuous seam weld in tubing, it will generally be necessary to use welding rollers which cooperate together and are provided with welding surfaces and, laterally of the welding surfaces, with flanges which part-off excess metal radially outwards of the weld. Such rollers are described in the specification of co-pending U. S. application Serial No. 43,096, now Patent No. 2,639,633, May 26, 1953. After welding, it is possible to improve the appearance, and in some cases the strength, of the tubing by a subsequent operation such as swaging. Thus, the tubing may be run after welding through a tube reducing machine which comprises either hammers which deliver rapid blows on the outside of the weld or rollers which bear in succession on the outside of the weld and tubing to make the metal of the tubing take the desired shape. Alternatively, any other convenient known means may be used for producing the required result.

Figure 10:
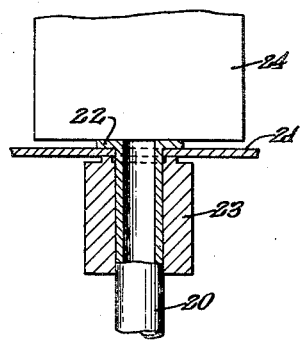
Figure 10 illustrates a die arrangement for welding a tube to a plate.

An example of ring welding is shown in Figure 10. Here a tube 20 is joined to a plate 21 by a single-sided method. The tube 20 passes through a fitting hole in the plate 21 and is flanged back at 22, the weld being made between a split-ring tool 23 which is placed over the tube 20 and a flat anvil 24 which rests against the flange 22. In this way, the joint is sealed by the weld and locked mechanically by the inward radial flow of the plate material around the hole.

Where a tube has to be joined to a thick plate, as shown in Figure 11, it is possible to weld to the plate material by machining a relief around the hole so as to leave a ring 25 of material standing up to be welded against. The pressure is then applied to the welding point through a ring-shaped tool 26 which has a pilot bar 27 running through the tool 26 into the tube 20 and an annular flat welding face 28 made to correspond with the ring 25 of material on the plate 21. The flange 22 is trapped between the ring 25 and the face 28 and the relief 29 provides room for the radial flow of metal.

Figure 12:
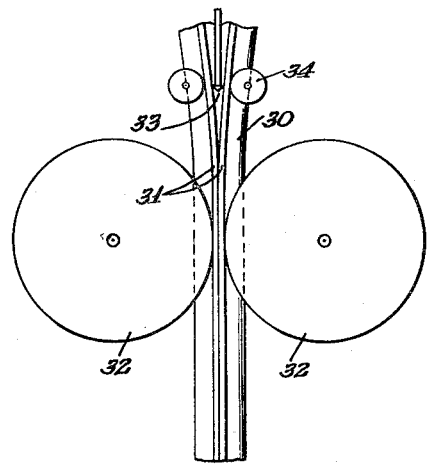
Figure 12 shows a method of cleaning the surfaces to be welded.

Under certain conditions and for certain materials, it may be desirable to remove any surface oxidation, impurities or contamination by taking a light cut over the metal surfaces to be welded. In the case of a continuous welding process, this cut should be taken as close as possible to the welding tools or dies. In other cases, it may merely replace scratch-brushing. One way of taking a slight cut from the surfaces to be welded in the case of the continuous seam welding of aluminum tubing is shown by way of example and somewhat diagrammatically in Figure 12. In the figure, the tubing 30 has radial flanges 31 to be welded together by welding rolls 32 and a double-edged diamond, tungsten carbide or other suitable cutter 33 is arranged to take a small cut from the surfaces to be welded together. The cutter 33 is made as small as possible to allow the cleaning operation to be effected very close up to the welding rolls 32 and in this way the chance of contamination of the surfaces to be welded after cleaning is reduced to a negligible value. Backing rolls 34 are provided against which the flanges 31 press during the cutting operation. Clearly, if the tubing 30 is around an electric cable in the form of a sheathing, there is little or no chance of say impregnating material of the cable seeping or working up to contaminate the surfaces after cleaning.

Figure 13:
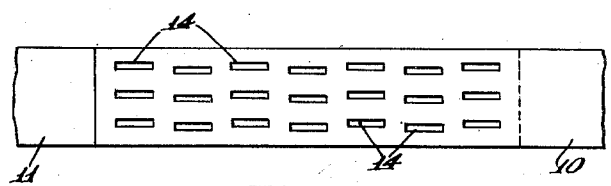
Figure 13 is a plan view of a multiple staggered spot weld joint according to the invention.

From the above it will now be clear that in the case of welding a seam of the overlapping type, the individual welds may be made along a single line by cooperating tools which make a short straight line weld parallel to the length of the line or there may be welds along two or more spaced parallel lines, the sealed areas around any two adjacent welds overlapping or meeting to form an effective seam weld although no two adjacent welds meet. In the latter case, the welds along one line may be staggered relative to the welds in an adjacent line, as shown in Figure 13, so that the welds in one line cooperate with the welds in the adjacent line to effect a good seam. Thus, a shouldered tool with two welding tips may be used to produce two lines of staggered welds. With this method, good compacting of the seam is obtained.

If desired, the individual weld lines may be inclined at an angle to the length of the line of the weld, e. g., in echelon, and instead of being straight line welds, other shapes such as a chevron shaped weld may be used.

The welds may be produced either by one or more reciprocating tools on both sides of the contacting surfaces, or by a single tool on one side and a mandrel or anvil on the other side, the surfaces being moved relatively to the tools and mandrels as welding proceeds along the seam, or by one or more rollers or wheels on one side having welding teeth and a mandrel or mandrels, which may be in the form of rollers on the other side. Preferably the mandrel or mandrels have a surface or surfaces shaped to fit the adjacent surface of the metal but it or they may also have welding teeth.

In accordance with another embodiment of the present invention, a shouldered tool for effecting cold pressure welding is formed with a surface arranged to engage the metal to be cold pressure welded and, projecting beyond or from the surface, a pressure tip or tooth arranged to effect welding by causing flow of the metal, the said surface of the tool being arranged to remove, or reduce substantially, any distortion adjacent to a weld and produced by the welding process and possibly also to control the percentage reduction in thickness at the weld.

If two metal pieces are to be joined at a relatively small overlapping area, such as a pair of plates, strips, sheaths or the like, then a single weld or a limited number of welds may be applied, the invention not being limited to line or seam welding comprising a large number of discrete or spot welds but applying broadly to any case where a single or limited number of welds is sufficient to connect two work pieces, in the manner shown in greater detail before.

Thus, whether a reciprocating tool or roller with teeth is used for effecting the welds, it is desirable that the tool or roller is so formed as to restore distorted metal to a better shape and to prevent over-penetration into the metal surfaces. In the case of a reciprocating tool, a pressure tip may be formed on the flat end of the tool, engagement of the flat end of the tool with the metal preventing further penetration of the tip and effecting flattening of the metal around the indentation produced by the tip. In the case of a roller, the welding teeth would project the required distance from the rim of the roller, the said rim limiting the penetration of the teeth or controlling percentage reduction and restoring the distorted metal. The tip or teeth will, of course, be shaped to form the required cold weld.

The actual mechanism of cold pressure welding is not yet fully and completely understood but very satisfactory results have been obtained by following the details and information given above. Whilst it was well known that certain metals when subjected to pressure begin to flow when the pressure exceeds a value dependent on the particular metal, I have succeeded in using this fact to make two streams of metal flow together into one as though the metals were melted together but without the application of external heat or electric current.

In the foregoing, the invention has been described in the form of a few illustrative devices. It will be apparent, however, that variations and modifications may be made, without departing from the broader spirit and scope of the invention as set forth in the appended claim. The specification and drawings are accordingly to be regarded in an illustrative rather than a limiting sense.

I claim:

A method of cold pressure spot lap welding two members of ductile metal comprising cleaning the areas of contact to be joined to produce pure uncontaminated metallic surfaces, arranging said members with the cleaned areas in contacting relation, supporting one of the contacting members against surface distortion over an area opposite to and substantially extending beyond the area of the weld to be produced, and applying, without the use of external welding heat, to a localized area of the other member a pressure in a direction at right angle to the interface between the members, to cause an indentation in said other member coupled with the simultaneous drawing of said last-mentioned member beyond the plane thereof, thereby indenting said other member and creating an extensive action at the interface changing the same from flat to rounded configuration, said indentation and drawing being sufficient in its action and reaction on said other member to cause such an interfacial metal flow and extensive action at the interface as to create a solid phase welding bond thereat.

References Cited in the file of this patent

UNITED STATES PATENTS 2,522,408   Sowter _____ Sept. 12, 1950